United States Patent
Joshi

(10) Patent No.: US 8,849,511 B2
(45) Date of Patent: Sep. 30, 2014

(54) APPARATUS AND METHOD OF DETERMINING POWER OF BASE VALUES USED IN VEHICLE APPLICATIONS

(71) Applicant: Continental Automotive Systems, Inc., Auburn Hills, MI (US)

(72) Inventor: Bijal Joshi, Schaumburg, IL (US)

(73) Assignee: Continental Automotive Systems, Inc, Auburn Hills, MI (US)

( * ) Notice: Subject to any disclaimer, the term of this patent is extended or adjusted under 35 U.S.C. 154(b) by 0 days.

(21) Appl. No.: 13/756,900

(22) Filed: Feb. 1, 2013

(65) Prior Publication Data
US 2013/0211671 A1    Aug. 15, 2013

Related U.S. Application Data

(60) Provisional application No. 61/593,424, filed on Feb. 1, 2012.

(51) Int. Cl.
| | | |
|---|---|---|
| *G06F 7/00* | (2006.01) | |
| *H02J 7/00* | (2006.01) | |
| *H02H 7/18* | (2006.01) | |
| *G06F 7/556* | (2006.01) | |
| *G06F 1/03* | (2006.01) | |

(52) U.S. Cl.
CPC ............... *G06F 7/00* (2013.01); *G06F 1/0307* (2013.01); *G06F 7/556* (2013.01)
USPC .............................. 701/36; 320/128; 307/10.7

(58) Field of Classification Search
USPC ............................... 701/36; 320/128; 307/10.7
See application file for complete search history.

(56) References Cited

U.S. PATENT DOCUMENTS

| | | | | |
|---|---|---|---|---|
| 5,742,738 | A  * | 4/1998 | Koza et al. | 706/13 |
| 7,116,009 | B2 * | 10/2006 | Tamai et al. | 307/10.7 |
| 7,321,220 | B2 * | 1/2008 | Plett | 320/128 |
| 7,530,851 | B2 * | 5/2009 | Parnis | 439/620.29 |
| 7,656,122 | B2 * | 2/2010 | Plett | 320/128 |
| 7,969,120 | B2 * | 6/2011 | Plett | 320/145 |
| 8,024,082 | B2 * | 9/2011 | Richter et al. | 701/22 |
| 8,509,450 | B2 * | 8/2013 | Sun | 381/66 |
| 2007/0019825 | A1 * | 1/2007 | Marumoto et al. | 381/94.1 |
| 2008/0119982 | A1 * | 5/2008 | Yamada | 701/35 |
| 2009/0184577 | A1 * | 7/2009 | Parnis | 307/9.1 |
| 2009/0299742 | A1 * | 12/2009 | Toman et al. | 704/233 |

OTHER PUBLICATIONS http://en.wikipedia.org/wiki/Taylor_series (Retrieved from the Internet on May 15, 2013).
https://en.wikipedia.org/wiki/Power_series (Retrieved from the Internet on May 31 2013).

* cited by examiner

*Primary Examiner* — Thomas G Black
*Assistant Examiner* — Tyler Paige

(57) ABSTRACT

A signal representing a numerical value from a vehicular application is received. A power value is calculated and the power value is a predetermined based raised to the power of the numerical value. The calculating using multiplication and shifting operations and the calculating further accesses a look-up table stored in a memory. The calculated power value is returned to the vehicular application. At the vehicular application, the calculated power value is utilized in a calculation and a result of the calculation is obtained. A parameter of the vehicular application according is altered to the result.

18 Claims, 4 Drawing Sheets

APPARATUS AND METHOD OF DETERMINING POWER OF BASE VALUES USED IN VEHICLE APPLICATIONS

TECHNICAL FIELD

This application relates to processing signals and calculating various values used by or associated with vehicular applications and more specifically, to making these determinations in an efficient manner.

BACKGROUND OF THE INVENTION

Within vehicles, various components are utilized such as those that communicate with each other and with external entities. For instance, vehicles are often equipped with various types of communication systems that provide or facilitate various types of functions. In this respect, a vehicle may be equipped with a Global Positioning Satellite (GPS) location determination system that communicates with a GPS satellite and provides the ability to locate and track the vehicle. Other vehicle applications suppress echoes or remove noise from received signals. Still other applications display various types of information to users.

Various calculations are performed at these applications. For example, distances, speeds, amounts, and other parameters may need to be determined. A mathematical formula is often used in these determinations. Calculating these mathematical functions in efficient manner is important part for porting any algorithm on embedded devices in a vehicle (or at any other location). Having sufficient resolution for these calculations is also of importance. Often, a power calculation (e.g., $a^{x \cdot y}$) needs to be determined since some of the equations may utilize such functions. To take a few examples, noise removal and echo cancellation are examples of applications where the equations often utilize power calculations. As used herein, power calculations refer to raising a base number to an integer or real number (e.g., raising a to the x·y power, $a^{x \cdot y}$).

Unfortunately, previous approaches at obtaining power calculations were either slow (for better precision) or imprecise (for faster computation) in calculating base two numbers or numbers having other bases (e.g., "e" or 10 or any other value). These problems have resulted in general user dissatisfaction with previous approaches.

BRIEF DESCRIPTION OF THE DRAWINGS

For a more complete understanding of the disclosure, reference should be made to the following detailed description and accompanying drawings wherein:

FIG. 1A depicts a first power calculation module within a first vehicular application and a second power calculation module within a second vehicular application, and FIG. 1B depicts a single power calculation module coupled to the first vehicular application and coupled to the second vehicular application;

Figure 1A:
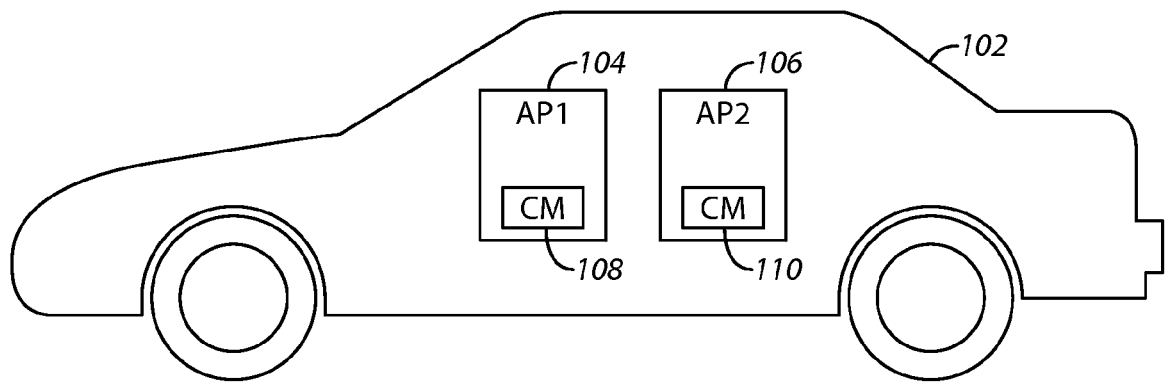
FIG. 1A and FIG. 1B are block diagrams of a vehicular system that utilizes the approaches described herein to obtain power calculations according to various embodiments of the present invention, in particular.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

The approaches described herein provide efficient and simple arithmetic approaches of calculating power of 2 (or power of any base) for any real number. In one example, a lookup table is utilized to obtain the desired result. In one aspect, extending the size of lookup table can divide the calculation step even further. Finally, a single step process can be utilized on how to extend this power of 2 calculation to other popular power values, e.g. power of 10 and power of e. The approaches described herein can be implemented using hardware and software.

In one aspect, high precision power of 2 are calculated using look up tables. The simplicity of the approaches described herein make them especially suitable for implementation by hardware in integrated circuits, or, by software in digital signal processors (DSPs) or different kinds of control units.

In many of these embodiments, a signal representing a numerical value from a vehicular application is received. A power value is calculated and the power value is any given, predetermined base based raised to the power of the numerical value. That is, the approaches described herein can be extended to any base. The calculation uses multiplication and shifting operations and further accesses a look-up table stored in a memory. The look-up table may be a data structure having any format and the memory may be any type of computer memory (e.g., RAM, ROM, and so forth). The calculated power value is returned to the vehicular application. At the vehicular application, the calculated power value is utilized in a calculation and a result of the calculation is obtained. A parameter of the vehicular application according is altered to the result.

In some aspects, the vehicular application is an application such as a noise removal application, an echo canceller application, or a display application. Other examples of applications are possible. In other aspects, the base is 2, e, or 10. That is, the approaches described herein can be extended to any base. Other examples of base numbers are possible.

In yet other aspects, the calculation obtains a value for $2^{x \cdot y}$ where x and y are integers and x·y represents a real number. In still other aspects, the calculation obtains $2^x$ by using a shifting operation and obtains $2^{0 \cdot y}$ by using the look-up table. In one particular example, the application is an echo canceller application and the parameter relates to an amount of echo present in a received signal.

In others of these embodiments, an apparatus for calculating a power value includes an interface, a memory, and a processor. The interface includes an input and output and the interface is configured to receive a signal at the input representing a numerical value from a vehicular application (e.g., an echo canceller application). The memory includes and has stored therein a look-up table. The processor may, in one example, be a digital signal processor (DSP) and may be shared with/operate the application.

The processor is coupled to the interface and the memory, and is configured to calculate a power value. The power value is any given, predetermined base raised to the power of the numerical value. The calculation uses multiplication and shifting operations and the calculation further accesses the look-up table stored in a memory. The processor is further configured to return the calculated power value to the vehicular application at the output of the interface.

At the vehicular application, the calculated power value is utilized in a calculation and the result of the calculation is obtained. Subsequently, a parameter of the vehicular application according to the result is altered. For example, if the application is an echo cancellation application, this application may include equations that are utilized to determine the amount of echo as well as values to reduce the echo. Other examples of applications and the parameters utilized by mathematical equations utilized by these applications are possible.

Figure 1B:
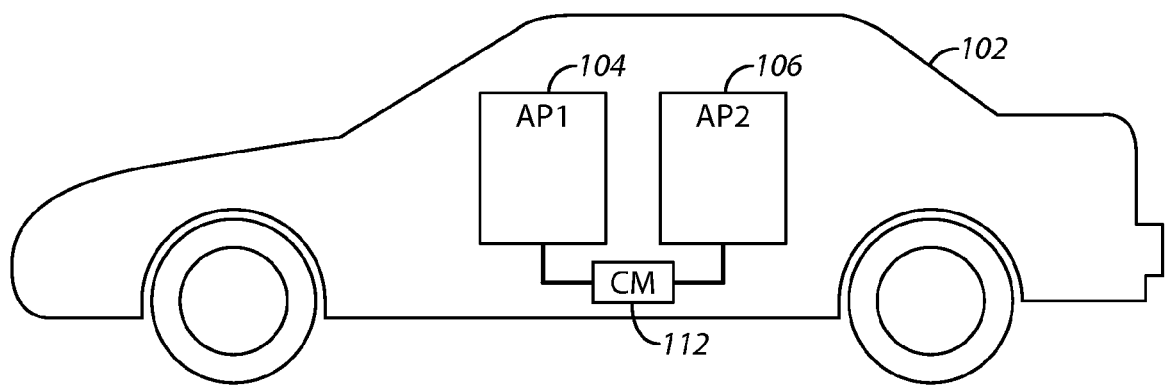

Referring now to FIG. 1A and FIG. 1B, one example of a system using power calculations made according to the present approaches is described. In both FIG. 1A and FIG. 1B, a vehicle 102 includes a first application 104 and a second application 106. The application can be any application as used in a vehicle such as an echo cancellation application, a noise removal application, a telemetric application, a vehicle safety application, an engine control application, a tire pressure monitoring application, to mention a few examples. The applications 104 and 106 require power calculations. That is, they require a base (e.g., 2, 10, or e) to be raised to a certain power. As shown in FIG. 1A, a power calculation module 108 is disposed in application 104 while a power calculation module 110 is disposed in module 106. The modules 108 and 110 may actually utilize the same processor, memory, or other components as used in their respective module 104 or 106. In this respect, the power calculation may be implemented as computer instructions stored on computer media (e.g., memory) and executed by a processing element (e.g., a DSP), or computer hardware, or some combination of these elements.

As shown in FIG. 1B, a power calculation module 112 is shown as being separate from the application modules 104 and 106 using a separate memory and processor. In this respect, it may utilize computer instructions stored on computer memory and executed by a processing element, may be a hardware element, or may be some combination of hardware and software elements. The modules 104 and 106 may be physically separate modules (e.g., physically separate hardware modules), or they represent functional modules implemented, for example, in software.

The power calculation modules 108, 110, and 112 use an approach to calculate a power of a base 2 (or any other base). In one aspect, this is accomplished using subtraction, multiplication, and/or shifting operations in memory (e.g., in buffers). The modules 108, 110, or 112 receive a number for which a power of which is to be determined, and the result is determined and passed back to the application. The power operation is quick, efficient, and results in a result with an adequate resolution that is typically the same or greater resolution as compared to previous approaches. The value calculated can be used in all types of calculations that control vehicle operations and signal processing, to mention a few examples. For example, various equations are used in echo cancellers and the results obtained by the calculation modules 108, 110, and 112 are used by the application modules to cancel echoes in the vehicle communication systems.

Figure 2:
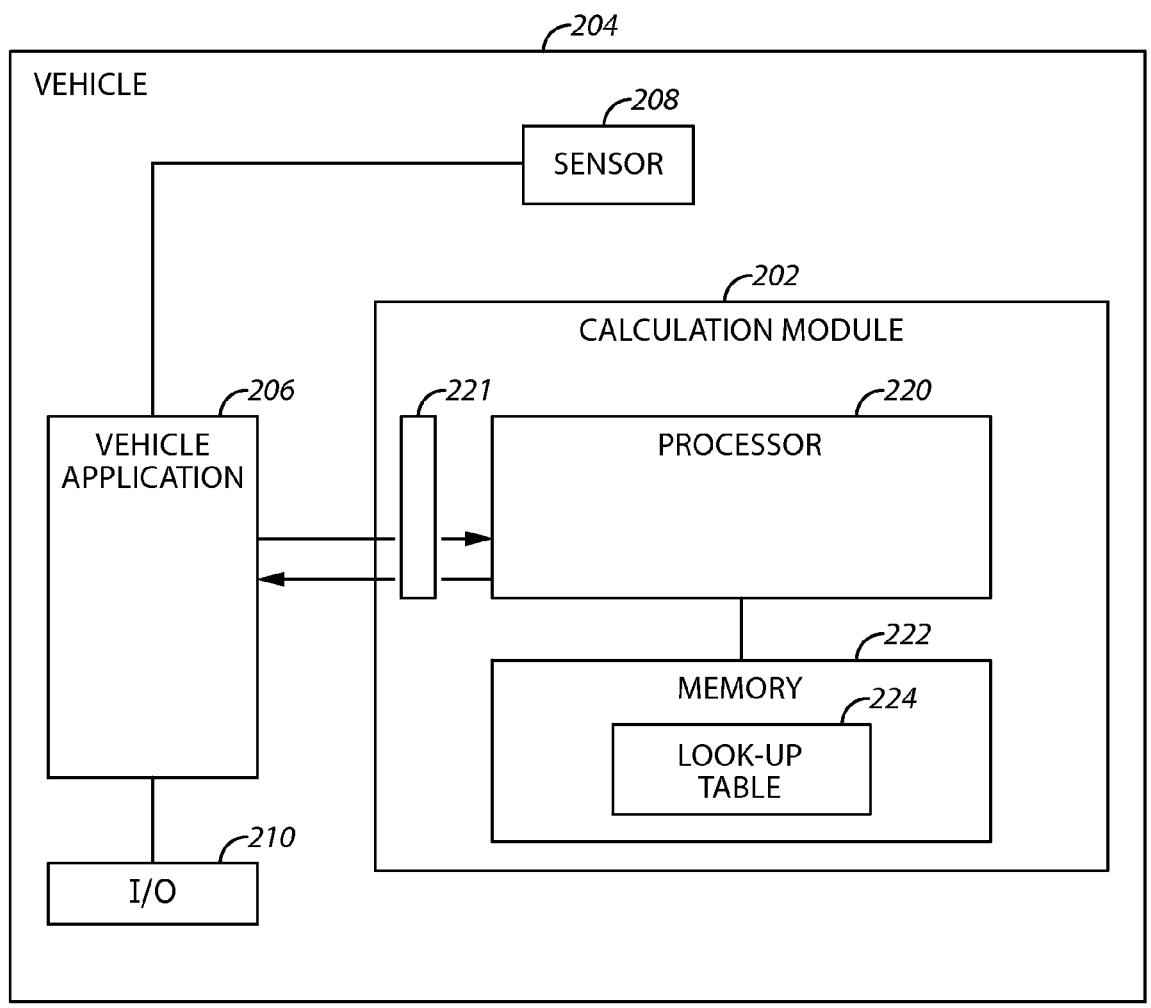
FIG. 2 comprises a block diagram of an apparatus that performs power calculations according to various embodiments of the present invention.

Referring now to FIG. 2, one example of a system for calculating powers for vehicular applications is described. The system includes a power calculation module 202 disposed in a vehicle 204. An application module 206 is used to perform some vehicular application. This application can be echo cancelling, noise cancelling, or the displaying of information in the vehicle to mention a few examples. Although shown as separate elements, it will be appreciated that the calculation module 202 may be part of the application module 206 and use the same processor as the application module 206. Here, for simplicity, the modules 202 and 206 are shown as being separate.

The calculation module 202 operates to calculate a power of two as described herein. The calculation module 202 includes a processor 220, an interface 221, and memory 222 with a look-up table 224. The application module 206 may be coupled to a sensor 208 which provides sensor inputs to the application 206 and an input/output device 210 that provides user inputs/outputs (e.g., a display, a communication line or channel). It will be understood that in some examples the sensor 208 and the device 210 may be omitted. In one example, the application 206 is an echo canceller application and the I/O device 210 represents a communication channel for which echo cancellation is provided by the application 206. The echo canceller application uses equations for which power of 2 calculations are needed. These calculations are provided by calculation module 202. As mentioned, both the power calculation and echo cancellation functions may be performed using the same memory and digital signal processor but are shown as being separate here in FIG. 2.

For fixed point arithmetic, a binary point is predetermined. For a given real value a fixed point representation in 32-bit integer with binary point at bit 16 can be made as follows:

$$x \cdot y(\text{dec}) = \text{bit}(32-17) \cdot \text{bit}(16-1) \text{ (binary)} \quad (1)$$

where, x is the integer portion of the value, represented by bits 17 to 32, and y is the fractional portion of the value, represented by bits 1 to 16.

Even though a binary point is at bit 16, it is not necessarily a physical division of the number. The actual integer representation of the real number is as if $x \cdot y$ has been multiplied by $2^{16}$. In this example y is represented by lower 16 bits of the 32 bits value. If the fixed point moved higher, the fractional value (y) will be represented with a greater number of bits and vice versa.

$$\text{fixedpo int}(x \cdot y) = x \cdot y \times 2^{fp} \quad (2)$$

Where, fp represents a bit fixed point is set to (fp=16 in equation 1).

Equation (2) can be split for integer and fractional part as follows.

$$\left. \begin{array}{l} x = 2^{32-fp} + \ldots + 2^0 \\ 0 \cdot y = 2^{-1} + \ldots + 2^{-fp} \end{array} \right\} \quad (3)$$

A power of 2 for a real number can be represented as follows:

$$\text{pow}(2, x \cdot y) = 2^{x \cdot y} \quad (4)$$

Where, x is the integer part and y is the fractional part of the real number.

Equation (1) can also be written as follows:

$$\text{pow}(2, x \cdot y) = 2^{x+0 \cdot y} = 2^x \times 2^{0 \cdot y} \quad (5)$$

Equation (5) is the calculation made by the processor 220 and this calculation is performed using only simple mathematical operations (multiplication, subtraction, bit shifting) and/or the use of a look-up table. In so doing, the speed and efficiency of obtaining the result is increased.

If equation (4) is separated into integer and fractional portions, the power of 2 for the integer portion can be calculated using equation (6) below.

$$2^x = 1 << x \quad (6)$$

Where, "<<" is a binary left shift operator.

For the power calculation of the fractional part, similar extrapolation as in equation 4 is extended for total number of fraction bits. Following equation is just rewriting the fractional part from equation (3):

$$0 \cdot y = 2^{-1} + \ldots + 2^{-fp} \quad (7)$$

and $$2^{0 \cdot y} = 2^{2^{-1}} + \ldots + 2^{-fp} \quad (8)$$

Equation (8) represents similar pattern as shown in equation (5) and can be solved same way by dividing it for each bit.

As explained elsewhere herein, an approach of calculating power of 2 for any real number using equation (6) and (8) is described.

It is typically not practical to calculate equation (8) on the fly. However, since these are all constant values it can be stored as a lookup table stored in the memory 220. In one aspect, the lookup table 224 is of length 32 for 32-bit integer value, assuming fixed point can vary anywhere between 0 and 31.

The lookup table 224 could be generated for more than one fraction bit at a time, resulting in multi dimensional array of values instead of a single array of 32 values, e.g. a lookup table that compares 2 values instead of 1 will be of 4 dimensions and 16 values per dimension resulting in 64 value table that can reduce computational steps by half.

It will be appreciated that these approaches can be extended to calculate more popular powers of 10 and powers of e by scaling the value with an appropriate constant. Equation (9) shows an example of how pow10 can be calculated using pow2 multiplied by a constant.

$$pow10(x \cdot y) = pow2(x \cdot y \times \log_2 10) \quad (9)$$

After the power of two is calculated by the module 202 it is used by the module 206 for processing or control purposes. For instance, if the module 206 is an echo canceller, the power of two may be used in an equation in the echo cancellation algorithm (used to cancel echoes). If it is used in noise calculation, it is used to cancel noise. If it is a screen display, it may be used in the screen display.

Figure 3:
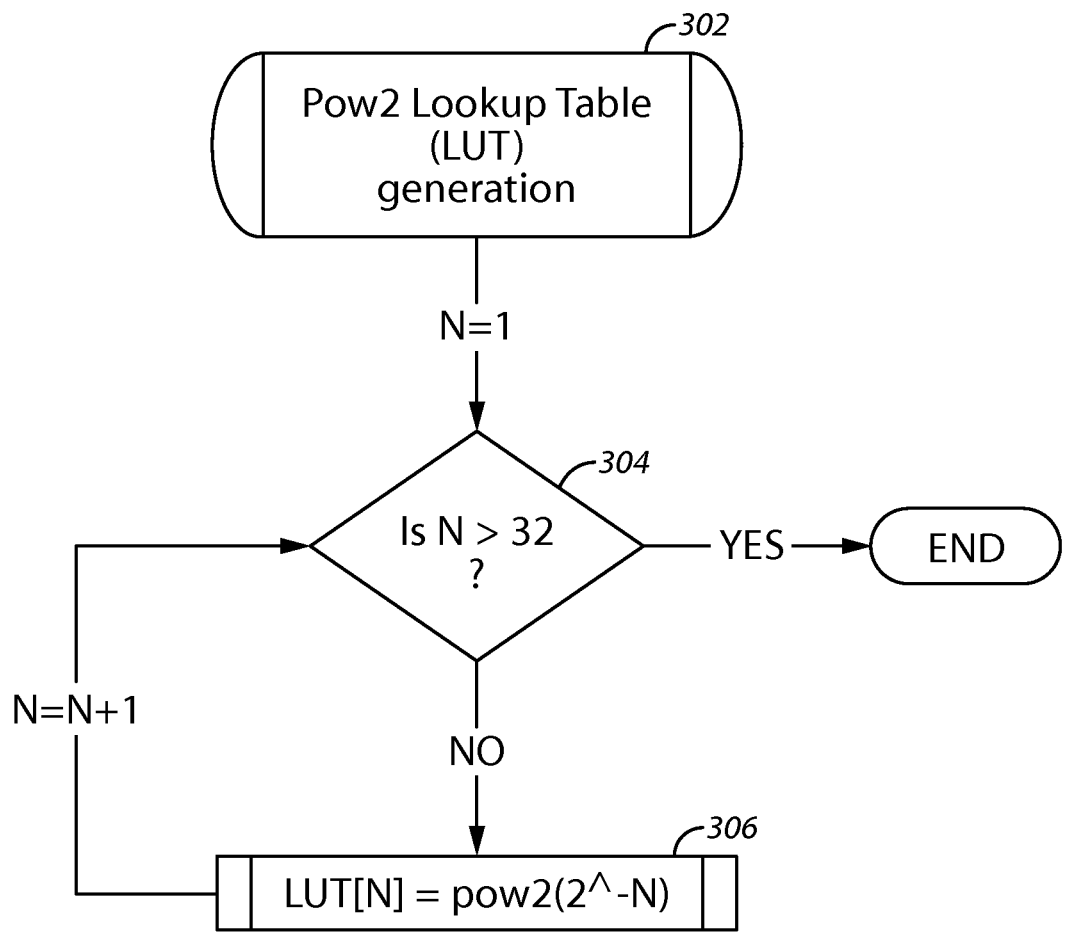
FIG. 3 comprises a flowchart of one approach for generating a look-up table that is used in powers of two calculations for vehicular applications according to various embodiments of the present invention.

Referring now to FIG. 3, one example of creating a look-up table 300 is described. At step 302, the variable N is set to 1. At step 304 it is determined if N is greater than 32. If the answer is affirmative, execution ends. If the answer negative, at step 306, the Nth entry of table is set to 2 raised to $2^{-N}$ power. This can be done at the time of manufacturing where the values are manually calculated off-line and used to populate the table 300. Execution then continues at step 304 as described above.

Figure 4:
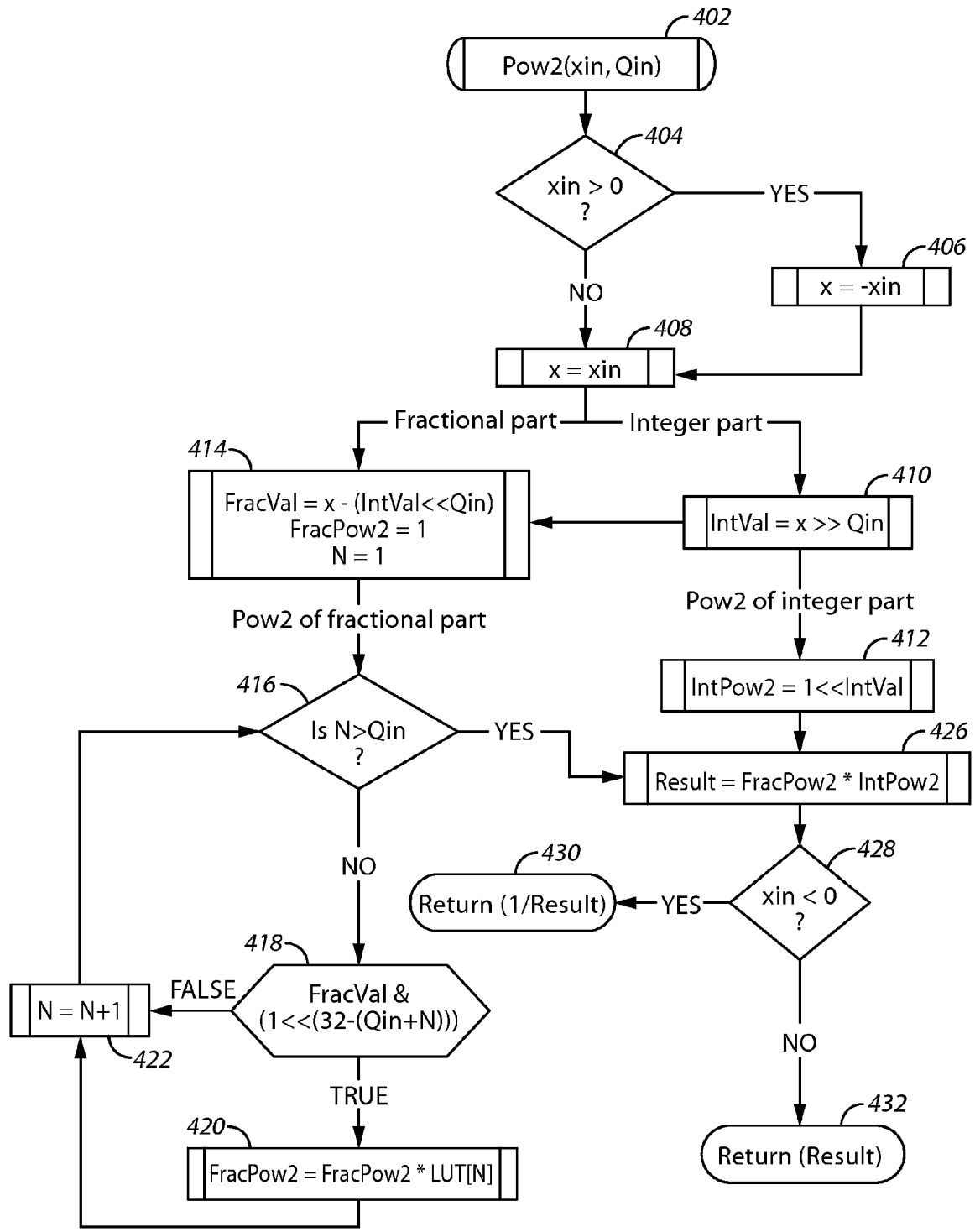
FIG. 4 comprises a flowchart showing one approach for obtaining the power calculation of a fixed point number according to various embodiments of the present invention.

Referring now to FIG. 4, one example of an approach for calculating a power value (in this example, power of 2) is described. At step 402, the value is input Pow2(xin, Qin) where xin is the value to calculate and Qin is the fixed point position. For example, if $2^{1.75}$ is desired and the binary point is at the $16^{th}$ position Pow2(1.75, 16) will be input.

At step 404, it is determined if xin is less than zero, then at step 406, xin becomes −xin and execution continues at step 408. At step 408, x is set to xin and x (in this case 1.75) is separated into a fractional part (in this case, 0.75) and an integer part (in this case, 1).

At step 410, IntVal is set to a right shift of x by 16. In this example, shifting over 16 values yields $2^0$ which represents 1. This operation can be accomplished by using a shift register. Then, at step 412 the value 1 is left shifted by IntVal to get the power of two representation of the integer value. In this case, a left shift of 1 by 1 yields a value of 2.

Turning now to the fractional portion of the calculation, at step 414, FracVal is set to x−(IntVal<<Qin). In this case FracVal=1.75−(1)=0.75. FracPow2 is set to 1 and N is set to 1.

At step 416, it is determined if N>Qin. If the answer is affirmative, the result is obtained and execution continues at step 426 as described below. If the answer is negative, at step 418 a determination is made if the Nth bit is a 1. If the answer is affirmative, at step 420, FracPow2 is set to FracPow2 times the look up value of N. If it is not a 1, step 422 is executed which increments N by 1. The look-up values are two raised to $2^{-N}$ as stated above and these are pre-stored in memory.

In the example where FracVal is 0.75, this will mean 0.75 is $2^{-1}$ plus $2^{-2}$. The look-up value for N=1 (for $2^{-1}$) is 1.4142 and the look-up value for N=2 is 1.1892 (for $2^{-2}$). These are multiplied together at step 420 to obtain 1.6817.

At step 426, the variable Result is set equal to FracPow2 times IntPow2. In this case, Result is Fracpow2 (in this case, 1.6817) multiplied by IntPow2 (in this case 2) and this obtains 3.3635. A real value of the number can be obtained by multiplying it by $2^{16}$.

At step 428, it is determined if xin was less than 0. If the answer is affirmative, 1/result is returned at step 430. If the answer is negative, the result is returned at step 432.

It will be appreciated that although the examples described herein have been made with respect to applications that are resident at or within a vehicle, that these approaches are in no way limited to vehicular applications. For example, it will be understood that these approaches may be implements in various types of communication systems (e.g., cellular, satellite, to mention two examples)

Furthermore and as already mentioned, it will be appreciated that the approaches described herein can be implemented as some combination of computer hardware and/or software such as computer instructions stored on a media and executed by a general purpose processing device.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A method of calculating a power value for use in a vehicular application, the method comprising:
   receiving a signal representing a numerical value received from a vehicular application, the vehicular application receiving a signal from a sensor:
   calculating a power value for the signal representing a numerical value received from the vehicular application, the power value being a predetermined base raised to the power of the numerical value, the calculating using at least some multiplication and shifting operations the calculating, also using at least one value obtained from a table of values stored in a look-up table stored in a non-transitory memory;

returning the calculated power value to the vehicular application;

at the vehicular application, utilizing the calculated power value in a calculation and obtaining a result of the calculation;

altering a parameter of the vehicular application according to the result.

2. The method of claim 1 wherein the vehicular application is an application selected from the group consisting of a noise removal application, an echo canceller application, and a display application.

3. The method of claim 1 wherein the base is selected from the group consisting of 2, e, and 10.

4. The method of claim 1 wherein the calculating obtains a value for $2^{x \cdot y}$ where x and y are integers.

5. The method of claim 4 wherein the calculating obtains $2^x$ by using a shifting operation and obtains $2^{0 \cdot y}$ using a value obtained from the look-up table.

6. The method of claim 1 wherein the application is an echo canceller application and wherein the parameter relates to an amount of echo present in a received signal.

7. An apparatus for calculating a power of, the apparatus comprising:

an interface with an input and output, the interface configured to receive a signal at the input representing a numerical value from a vehicular application, which receives signals from a sensor;

a non-transitory memory including and having stored therein a look-up table;

a processor coupled to the interface and the memory, the processor configured to calculate a power value, the power value being a predetermined base raised to the power of the numerical value, the calculation using at least some multiplication and shifting operations, the calculation further using a value obtained from the look-up table stored in the non-transitory memory, the processor further configured to return the calculated power value to the vehicular application at the output;

wherein at the vehicular application, the calculated power value is utilized in a calculation and a result of the calculation is obtained and wherein a parameter of the vehicular application according to the result is altered.

8. The apparatus of claim 7 wherein the vehicular application is an application selected from the group consisting of a noise removal application, an echo canceller application, and a display application.

9. The apparatus of claim 7 wherein the base is selected from the group consisting of 2, e, and 10.

10. The apparatus of claim 7 wherein the calculation obtains a value for $2^{x \cdot Y}$ where x and y are integers.

11. The apparatus of claim 10 wherein the calculation obtains $2^x$ by using a shifting operation and obtains $2^{0 \cdot Y}$ using a value obtained from the look-up table.

12. The apparatus of claim 7 wherein the application is an echo canceller application and wherein the parameter relates to an amount of echo present in a received signal.

13. A non-transitory computer usable medium having a computer readable program code embodied therein, said computer readable program code adapted to be executed to implement a method of calculating a power value, the method comprising:

receiving a signal representing a numerical value from a vehicular application;

calculating a power value, the power value being a predetermined base raised to the power of the numerical value, the calculating using at least some multiplication and shifting operations, the calculating further using at least one value obtained from a table of values stored in a non-transitory memory;

returning the calculated power value to the vehicular application; at the vehicular application, utilizing the calculated power value in a calculation and obtaining a result of the calculation;

altering a parameter of the vehicular application according to the result.

14. The computer usable medium of claim 13 wherein the vehicular application is an application selected from the group consisting of a noise removal application, an echo canceller application, and a display application.

15. The computer usable medium of claim 13 wherein the base is selected from the group consisting of 2, e, and 10.

16. The computer usable medium of claim 13 wherein the calculating obtains a value for $2^{x \cdot Y}$ where x and y are integers.

17. The computer usable medium of claim 16 wherein the calculating obtains $2^x$ by using a shifting operation and obtains $2^{0 \cdot Y}$ by using the look-up table.

18. The computer usable medium of claim 13 wherein the application is an echo canceller application and wherein the parameter relates to an amount of echo present in a received signal.

* * * * *